United States Patent [19]

Stein

[11] Patent Number: 4,706,042

[45] Date of Patent: Nov. 10, 1987

[54] ATOMIC OR MOLECULAR MASER CAVITY RESONATOR

[75] Inventor: Samuel R. Stein, Boulder, Colo.

[73] Assignee: Ball Corporation, Muncie, Ind.

[21] Appl. No.: 867,847

[22] Filed: May 23, 1986

[51] Int. Cl.$^4$ .............................................. H01S 1/06
[52] U.S. Cl. .................................................. 331/94.1
[58] Field of Search ................................... 331/3, 94.1

[56] References Cited

U.S. PATENT DOCUMENTS

| 2,698,923 | 1/1955 | Edson | 333/83 |
| 4,123,727 | 10/1978 | Peters | 331/94.1 |

OTHER PUBLICATIONS

"A New Kind of Passively Operating Hydrogen Frequency Standard", F. L. Walls, and H. Hellwig, Proceeding, 30th Annual Symposium on Frequency Control, pp. 473–480, Jun. 1979 Fort Monmouth, New Jersey.
"A Small Passively Operated Hydrogen Maser", D. A. Howe, F. L. Walls, H. E. Ball and H. Hellwig, Proceedings, 33rd Annual Symposium on Frequency Control, pp. 554–562 (1979).

Primary Examiner—Eugene R. LaRoche
Assistant Examiner—Robert J. Pascal
Attorney, Agent, or Firm—Gilbert E. Alberding

[57] ABSTRACT

An atomic resonance apparatus of the subject invention comprises means forming a cavity for containing an ensemble of atomic species in a gaseous state at a reduced pressure, said cavity forming means being defined by a container having outer and inner surfaces formed of a dielectric material and comprising the major portion of said container, said inner surface of said container defining a cavity resonator, said cavity resonator having an aperture for axial radial communication from the outer to the inner portions of said container for the introduction and withdrawal of atomic species therefrom, said cavity having a thin coating on its inner surface of an energy state minimizing composition to substantially reduce the interaction of said atomic species with said surface, said container having on its outer surface a thin outer conductive layer of a predetermined configuration, means proximate the end walls of said container for excluding atomic species therefrom, means providing a low intensity magnetic field for quantizing said ensemble of atomic species, means forming a resonant circuit electromagnetically coupled to the ensemble of atomic species and tuned to substantially the natural atomic hyperfine resonant frequency of the atomic species for receiving electromagnetic wave energy therefrom of an exceedingly stable frequency and spectral purity.

21 Claims, 4 Drawing Figures

ATOMIC OR MOLECULAR MASER CAVITY RESONATOR

BACKGROUND OF THE INVENTION

This invention relates generally to atomic or molecular maser devices and more particularly to improvements in resonators, especially for a hydrogen maser frequency standard.

An atomic frequency standard is a device having a basic resonant system derived from an atomic or molecular specie experiencing a transition between two well-defined energy levels of the atom or molecule. The transition occurs in a reasonably convenient domain of the electromagnetic spectrum, the microwave region. The transition is employed as a highly stable frequency reference to which the frequency of a voltage-controlled crystal oscillator (VCXO) can be electronically locked. Thus, the high stability and relative insensitivity associated with an atomic reference frequency is thereby transferred to the VCXO.

Hydrogen, cesium and rubidium frequency standards are atomic-controlled oscillators in which the frequency of usually a 5 MHz or 10 MHz quartz crystal oscillator is controlled by means of a physics package and associated electronics that are devoted to maintaining that assigned output on a very long-term, exceedingly accurate and stable basis. By properly slaving the quartz crystal oscillator to the frequency of the atomic transition, the tendency of the quartz crystal to exhibit drifting due to aging and other inherent as well as environmental effects is markedly suppressed.

In a hydrogen maser frequency standard, hydrogen is customarily stored under pressure in a container and is passed through and purified by a hot palladium-silver alloy diffusion barrier that provides control of the hydrogen flux and subsequent beam intensity. The hydrogen, in molecular form, is introduced into an electrical discharge defined by a dissociation chamber which dissociates diatomic hydrogen into atomic hydrogen. Thereafter, the resultant hydrogen atoms emerge in a low-pressure region, are collimated into a beam and directed or focused through a state selection device, usually having a passageway of a few millimeters in diameter. The state selection device may be a hexapole or quadrapole magnet having a magnetic flux density at the pole tips of generally about 0.7 T or more. The state selection device generates an inhomogeneous magnetic field and is designed in such a manner so as to withdraw atoms in the lower hyperfine energy state and allows those hydrogen atoms to pass having the upper hyperfine state into a high Q-cavity resonator located in a microwave field region. In the cavity resonator, the atoms of hydrogen undergo interaction with a microwave field at a resonant frequency of about 1.4 GHz.

The cavity resonator into which the selected atoms of hydrogen are directed is surrounded by magnetic shields and is provided with an inner solenoid that creates a weak, substantially uniform magnetic field which is applied to the microwave field region in order to separate the different sublevels of the hyperfine state to insure that transitions occur only between levels where the Zeeman effect is quadratic.

The cavity resonator is designed to allow extremely long interaction times of atoms with the microwave field by coating the walls of the cavity resonator with special compositions, generally a fluorocarbon or the like to reduce atom perturbations through wall collisions. The interaction with the microwave field induces the hydrogen atoms in the selected energy state to make a transition to the lower state, thus radiating energy of a precise frequency to the field. In an active maser system, maser oscillations are self-sustaining when the atom density in the cavity resonator is such that the resultant induced transitions radiate enough coherent energy to more than offset cavity losses.

The hydrogen that departs from the cavity resonator may be readily removed by a vacuum system, generally by means of a high speed, getter pump along with a titanium sputter ion pump, both of which are generally housed in separate vacuum chambers. The getter materials that may be used for such a pump include Zr-Al, Zr-C and Zr-V alloys.

Although the general conditions recited above relate to an active maser mode, viz., using the maser principle itself in which there is coherent stimulated emission of the radiation within a suitable resonant structure, there is another mode, the so-called passive mode which may be employed for standard frequency generators. In the passive mode, an ensemble of particles (i.e. atoms or molecules) undergoing the desired quantum transition is used as a resonator and an auxiliary source of radiation (slave oscillator) is employed to produce the transitions which occur when the frequency of the radiation is near the nominal frequency. Thus, in a passive frequency standard, the atomic resonance has to be probed by an electromagnetic signal at the proper frequency which is produced by an auxiliary frequency generator whereas in an active frequency standard there is self-sustaining oscillation at the atomic resonance frequency.

SUMMARY OF THE INVENTION

The subject invention relates to an electrical cavity resonator comprising a container formed of a dielectric material and having spaced apart outer and inner surfaces, said container having a conductive layer formed on the outer surface of said container, the inner surface of said container defining an internal cavity having bonded on its surface an energy state minimizing coating, said container having means for limiting the exposure of atomic or molecular species experiencing a transition in energy levels to radial magnetic fields within the cavity. The container is also provided with an aperture at one end thereof for open communication therein.

An important feature of the subject invention is means for displacing or excluding species experiencing a transition of energy levels. In this aspect the species are excluded from the end regions of the container where the radio frequency magnetic field becomes purely radial i.e., lines of force extend radially from the central axis of the container. The two ends of the resonator are filled with dielectric material and therefore become regions that are inaccessible to the atoms or molecular species. By being absent therefrom, the species are not brought within a region where large radial fields exist, i.e., those fields proximate the ends of said container, but experience transitions in field where the central lines of magnetic force become more nearly axial along the longitudinal axis of the container. This is beneficial in that by reducing the magnitude of the radial radio frequency there is a reduction of a frequency shift referred to as the Crampton effect. This improvement, it is hypothesized, reduces maser frequency changes due to varying external d.c. magnetic fields. It should be appreciated that the Crampton effect frequency shift is proportional to the average, over the atoms storage region, of the product of the radial r.f. field amplitude and the radial d.c. field amplitude. In the subject invention there is a reduction of the value of this average by making the r.f. fields more nearly axial in the atoms storage region and by excluding atoms proximate the ends of the container where r.f. and d.c. radial magnetic fields have larger amplitudes.

An atomic resonance apparatus of the subject invention comprises means forming a cavity for containing an ensemble of atomic species in a gaseous state at a reduced pressure, said cavity forming means being defined by a container having outer and inner surfaces formed of a dielectric material and comprising the major portion of said container, said inner surface of said container defining a cavity resonator, said cavity resonator having an aperture for axial radial communication from the outer to the inner portions of said container for the introduction and withdrawal of atomic species therefrom, said cavity having a thin coating on its inner surface of an energy state minimizing composition to substantially reduce the interaction of said atomic species with said surface, said container having on its outer surface a thin outer conductive layer of a predetermined configuration, means proximate the end walls of said container for excluding atomic species therefrom, means providing a low intensity magnetic field for quantizing said ensemble of atomic species, means forming a resonant circuit electromagnetically coupled to the ensemble of atomic species and tuned to substantially the natural atomic hyperfine resonant frequency of the atomic species for receiving electromagnetic wave energy therefrom of an exceedingly stable frequency and spectral purity.

The cavity resonator is a critical component of an atomic or molecular maser device and several designs have been used for the hydrogen maser frequency standard, especially in university and government laboratories.

Walls, et al., in *Proceedings, 30th Annual Symposium on Frequency Control,* 473–480, (1976) describe a passive hydrogen resonator consisting of a cylindrical structure having an end plate having an inlet and outlet means for atomic species and a terminal end plate, said plates being sealingly connected to the cylindrical structure to define the cavity. The cylindrical structure is made of silicon dioxide or quartz and the end plates of aluminum. The internal surface defining the cavity is coated with teflon. Howe, et al., in 33rd *Annual Symposium on Frequency Control,* 554–562, (1979) further describe a passive hydrogen resonator cavity consisting of a cylindrical structure and end plates that are fabricated of aluminum oxide with the external surface portions of the cyclindrical structure being coated with silver and the end plates being also coated with a continuous silver coating but having their continuous silver coated surfaces facing the inside of the cavity. All of the internal cavity surface is coated with teflon in the conventional manner.

DESCRIPTION OF THE DRAWINGS

In the accompanying drawings which form part of the specification and wherein like numerals refer to like parts whenever they occur.

DESCRIPTION OF THE PREFERRED EMBODIMENTS

The subject electrical cavity resonator is the main device for generating coherent radiation of excellent purity, especially in the microwave range, from quantum mechanical particles undergoing resonance transitions between discrete energy levels. The subject invention provides a resonating device that has an unloaded Q value of at least about 5,000. The subject cavity resonator provides a small wall shift that is highly favorable, offers a cavity that has good vacuum characteristics as well as one that is readily tunable by a magnetic field to a predetermined value. Certain structural and/or design features of the resonator or storage means to be described herein are critical components of the maser device of the subject invention.

The cavity resonator is provided with a dielectric material which extends inwardly from the end walls and, therefore, provides for a region on both ends and within the confines of the cavity resonator where no atomic or molecular species may travel. By providing such means for excluding such species proximate the end walls the lines of force along the central axis are more nearly linear as compared to a cavity resonator without said excluding means. As can be appreciated the atomic or molecular species cannot penetrate to this region or volume where relatively large radial fields exist. The result of this is to substantially eliminate any maser frequency changes due to varying magnetic fields that are often associated with conventional passive hydrogen resonators such as employed by either Howe, et al., or Walls, et al., in the above-identified articles.

The cavity resonator of the subject invention has a conductive coating of a specified configuration to achieve a more or less hybrid electromagnetic mode of oscillation. This is accomplished mainly by the structural relationship of the cavity resonator which comprises a cylindrical portion with a continuous conductive coating affixed to the outer surface of the cylindrical portion and associated end walls or plates which have a discontinuous conductive coating on their outer surfaces. Although the cylindrical portion may have such a continuous conductive coating throughout the external surface, in another embodiment the surface may have a central band where no coating is placed; the conductive coating only existing as bands around the ends of the cylindrical portion for about one quarter of the distance at each end with the central portion being free of any coating. The coating on the end plates is discontinuous and comprises one or more concentric rings whose center is coincident with the longitudinal axis of the cylindrical portion of the resonator. It is important to appreciate that the outer conductive coating does not form any part of the inner surface or inner body of the cavity resonator.

Figure 3:
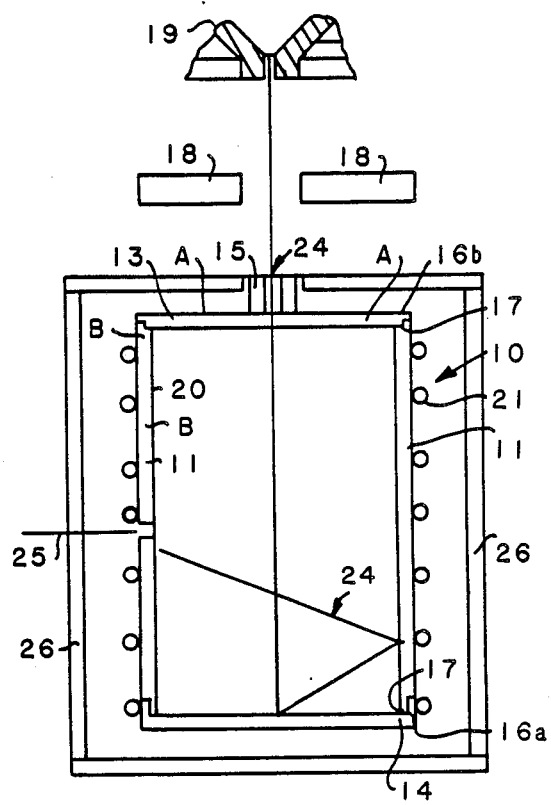
FIG. 3 is a schematic view of a hydrogen maser device having the electrical cavity resonator of the subject invention.
Figure 2A:
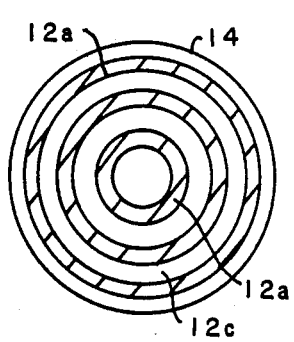
FIG. 2a and 2b are end views of the subject cavity resonator.
Figure 2B:
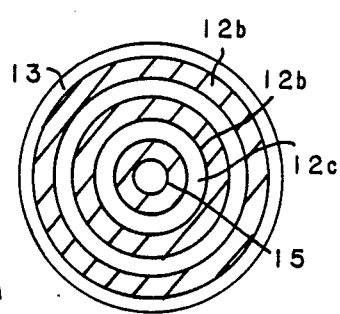
Figure 1:
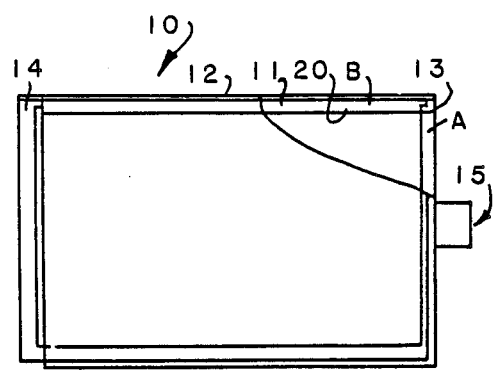
FIG. 1 is a view showing the electrical cavity resonator of the subject invention.

FIGS. 1, 2a and 2b depict views of the electrical cavity resonator of the subject invention. As can be observed the electrical cavity resonator 10 comprises a hollow circular structure 11 having an outer surface coated by a thin conductive layer 12. The end walls 13 and 14 are provided with grooves 16a, 16b which interlock with the internal grooves 17 of cylinder 11.

The electrical resonator 10 is a hollow circular cavity structure 11 having fixed end walls 13 and 14, the external surface of said resonator 10 having a discontinuous coating 12 on the circular portion and a discontinuous coating on the fixed end walls. The resonator 10 is associated with means for exciting said resonator with electromagnetic energy in a predetermined mode of oscillation. The configuration of the end walls on the outer surfaces thereof comprise at least one concentric ring 12a on each surface whose center is coincident with the longitudinal axis of the circular cavity structure 11.

For a good filling capacity, the cavity resonator 10 may take a number of shapes. The cavity resonator in accordance with the subject invention is specially designed and may be in a shape of a right circular cylinder structure 11 with sealingly engaged end walls 13 and 14 to define means to displace or exclude atoms experiencing energy transitions and an enclosed cavity in which such energy transitions occur. The cylinder structure 11 and end walls 13 and 14 may be fabricated from a range of dielectric materials, particularly those compositions having a dielectric constant greater than 9. It has been found that glass or ceramic, especially alumina ceramic materials are well suited for such fabrication. One end wall 13 is provided with an opening or aperture 15 for open communication between the inner and outer portions of the cavity resonator 10. In one embodiment the internal length of the cavity along its longitudinal axis is about 6 inches; the thickness of the cylinder structure is about 1 inch and the thickness of the end walls are each about ¼ inch.

The inner walls of the cavity resonator 10 that include the internal surfaces of the cylinder structure 11 and the two end walls 13 and 14 thereof are provided with an energy state minimizing coating 20. The main purpose of the coating 20 is to minimize interactions within the cavity so that there is a reduction in wall shift. The coating 20 is generally a dichlorodimethylsilane, tetrafluoroethylene, fluorinated ethylene-propylene, or a long straight chain saturated hydrogen. It has been found advantageous to use tetrafluoroethylene as it renders a coating that is energy state minimizing and serves as an effective sealing material along joining surfaces and makes an excellent bond therebetween. It is preferred that after coating the internal surfaces the resonator be placed in an oven or annealing chamber at a temperature sufficient to soften and coalesce the coated resin thereto. The internal coating of the resonator is thus formed into a continuous layer that offers a tight seal that is highly suitable for maintaining low pressures or vacuum systems since the joined surfaces at the end plates are united and held firmly together. The internal coating thickness should range from about one to two thousandths of an inch in order to be effective as an energy state minimizing coating. Several coatings may be applied successively in order to achieve the desired thickness.

An important structural feature of the subject cavity resonator is that its end walls 13 and 14 provide a filled region A and B, respectively, of dielectric material that ward off atomic or molecular species from entering the regions immediately adjacent or proximate to the conductive coating 12. The thickness of the dielectric coating may vary over a wide range depending on the size of the cavity resonator. For a small resonator made in accordance with the subject invention the thickness of the dielectric material was about one-twenty fourth the length of the cavity resonator.

In viewing FIG. 1 it will be observed that the resonator has an external conductive coating 12. The cylinder structure 11 and end walls 13 and 14 are treated on their external portions with a conductive composition in a predetermined configuration. The conductive material of coating 12 itself may be any of a number of conductive compositions. In one embodiment it has been found advantageous to use three different layers: first a copper base coating directly on the external surface of a ceramic cavity resonator followed by an overlayer of chromium or rhodium and thereafter gold. Generally, the first copper coating may be introduced as a mere flash coating by conventional electroless technique and thereafter by using conventional electrodeposition to further increase the thickness of the copper. The chromium or rhodium and gold may be readily deposited thereon.

A suitable range of thicknesses for the various conductive or metal layer is: about 300 to about 1000 microinches of copper, about 50 to about 125 microinches of chromium or rhodium and about 25 to about 75 microinches of gold. Such three layered system of metals provides a substantial advantage over the prior art in that the subject system is less prone to bond failures or weakening at the ceramic and metal interface. Moreover, when made in accordance with the predetermined configuration the conductive coating has the effect of suppressing oscillations of undersidered fields or modes. In addition, the layer of conductive metal allows it to be integrally bonded or brazed to various joint structures and the like to thereby secure the whole within the maser apparatus.

It is most desirable to provide an electrically resonant cavity resonator of high Q wherein unwanted modes of resonance thereof are suppressed or discriminated against by providing outlets for the electric field for the unwanted modes. Any nearly degenerate (same frequency) mode can produce a significant asymmetry in the lineshape of the cavity resulting in cavity mistuning. By employment of the circular ring configuration as herein described, the unwanted modes of oscillation are suppressed by interfering with their circulating currents while at the same time perturbing the current of the desired mode as little as possible.

The storage means or electrical resonator itself serves as a cavity that is tuned to resonate in the fundamental mode to the frequency of the wave emitted by the atoms during transition from higher to lower energy levels. When the cavity resonator is tuned close to the transition frequency and when the intensity of the incoming ensemble of atoms is large enough, oscillation takes place in which the atoms in the upper level are stimulated to radiate a signal having an exceedingly stable frequency. Thus, the atoms that enter the resonator enter an interaction region in an upper hyperfine state are stimulated to make transitions to the lower hyperfine state. In the case of hydrogen, the generated signal is picked up by a microwave output loop and is used to lock a crystal oscillator to the stable hydrogen transition frequency via frequency synthesizer and comparator.

A microwave cavity generally operates in the $TE_{011}$ mode and is usually surrounded by a suitable magnetic shielding such as molypermalloy or the like. The resonator is located in a region of constant phase axial radio frequency magnetic field within the cavity and tuned to the hyperfine transition frequency of hydrogen, approximately at 1.420,450,751 GHz. Further, a static magnetic field is produced by an a.c. coil outside the microwave cavity to separate the Zeeman levels of the upper hyperfine state.

While we have described a preferred embodiment of the invention, other embodiments of the invention will be apparent to those skilled in the art; and such embodiment and the equivalents of the described embodiments are covered by the scope of the following claims.

I claim:

1. An electrical resonator comprising a container having outer and inner surfaces, said container having a thin conductive outer layer and being formed substantially of dielectric material, said inner surface defining an internal cavity spaced from the outer surface of said container, said container being provided with an aperture therein for axial communication with the internal cavity of said container, said cavity having bonded on its inner surface an energy state minimizing coating, said container having means for excluding atomic or molecular species from a region of said resonator where r.f. magnetic fields are substantially radial.

2. An electrical resonator of claim 1 wherein the container is formed substantially of a dielectric material having a dielectric constant greater than 9.

3. An electrical resonator of claim 1 wherein the container is formed substantially of a dielectric material selected from the group consisting of ceramic and glass.

4. An electrical resonator of claim 2 wherein the container is formed substantially of alumina ceramic.

5. An electrical resonator of claim 1 wherein said excluding means includes a dielectric material to reduce the radial field within said cavity.

6. An electrical resonator comprising a container having outer and inner surfaces, said container being formed substantially of a dielectric material selected from the group consisting of glass and ceramic, said inner surface of said container defining an internal cavity, said container being provided with an aperture therein for open communication between the inner and outer portions of said container, said cavity being provided with an energy state minimizing coating, said container having on its outer surface a thin conductive covering composition of a predetermined configuration, and said container having means for displacing atomic or molecular species undergoing energy level transitions from a region of said container wherein there are substantial radial magnetic components.

7. An electrical resonator of claim 6 wherein the container is formed substantially of a material selected from the group consisting of glass and ceramic and having a high dielectric constant.

8. An electrical resonator of claim 6 wherein the container is a circular cylindrical body having fixed end walls, said body having a continuous covering composition bonded to the cylindrical surface thereof and having a discontinuous covering on the end walls thereof.

9. An electrical resonator of claim 8 wherein the discontinuous covering composition manifests itself in the form of at least one concentric ring in alignment with the longitudinal axis of said circular cylindrical body.

10. An electrical resonator of claim 6 wherein the energy state minimizing coating is a member polymer selected from the group consisting of dihalodialkylsilane, tetrafluroethylene, fluorinated ethylene-propylene, and a long straight chain saturated hydrocarbon.

11. An electrical resonator comprising a container having outer and inner surfaces, said container being formed substantially of a dielectric material selected from the group consisting of glass and ceramic materials, said inner surface defining an internal cavity spaced from the outer surface of said container and capable of being evacuated at atmospheric components, said container being provided with an aperture therein for open and direct communication with the internal cavity of said container, said cavity being provided with a coating composition selected from the group consisting of dichlorodimethylsilane, tetrafluroethylene, fluorinated ethylene-propylene, and a long straight chain saturated hydrocarbon, said container having a thin non-magnetic, conductive covering and having means for displacing atoms undergoing energy level transitions from a region therein where there are substantial radial magnetic components.

12. An electrical resonator of claim 11 wherein the means for displacing atoms undergoing energy level transitions reduces the radial electromagnetic field within the internal cavity occupied by said atoms.

13. An electrical resonator of claim 11 wherein the cavity may be evacuated to a pressure of about $10^{-7}$ mm Hg.

14. An electrical resonator of claim 11 wherein the container is a circular cylindrical body having fixed end walls, said body having a discontinuous covering composition bonded to the cylindrical surface thereof and having a discontinuous covering on said end walls thereof.

15. An electrical resonator of claim 14 wherein the discontinuous covering composition manifests itself in the form of at least one concentric ring whose center is coincident with the longitudinal axis of said cylindrical body.

16. An electrical resonator of claim 11 wherein the container further includes magnetic shielding structures and an associated heating means controllable to 1/100° C. at a temperature of about 70° C. surrounding said container.

17. An electrical resonator of claim 11 wherein the resonator further includes a solenoid means surrounding said resonator to supply a low intensity quantizing magnetic field thereto.

18. An electrical resonator of claim 17 wherein said quantizing magnetic field has an intensity of above $10^{-11}$ T.

19. An electrical resonator of claim 11 wherein said resonator includes coarse and fine tuning means for adjusting a predetermined resonant frequency.

20. An atomic resonance apparatus comprising means forming a cavity for containing an ensemble of atomic species in a gaseous state at a reduced pressure, said cavity forming means being defined by a container having outer and inner surfaces formed of a dielectric material and comprising the major portion of said container, said inner surface of said container defining a cavity resonator, said cavity resonator having an aperture for axial radial communication with the internal cavity of said container for the introduction and withdrawal of atomic species therefrom, said cavity having a thin coating on its inner surface of an energy state minimizing composition to substantially reduce the interaction of said atomic species with said surface, said container having on its outer surface a thin outer conductive layer of a predetermined configuration, means for displacing atomic species undergoing energy level transitions from a region of said container wherein there are substantial radial magnetic components, means providing a low intensity magnetic field for quantizing said ensemble of atomic species, means forming a resonant circuit electromagnetically coupled to the ensemble of atomic species and tuned to substantially the natural atomic hyperfine resonant frequency of the atomic species for receiving electromagnetic wave energy therefrom of an exceedingly stable frequency and spectral purity.

21. An atomic resonance apparatus of claim 20 wherein the atomic hyperfine resonant frequency is about 1.42 GHz.

* * * * *